(No Model.)

W. HILL.
BICYCLE PACKAGE CARRIER.

No. 600,364. Patented Mar. 8, 1898.

Witnesses:
C. B. Butler
A. H. Dickinson

Inventor:
William Hill
By W. T. Miller
Attorney.

THE NORRIS PETERS CO., PHOTO-LITHO., WASHINGTON, D. C.

UNITED STATES PATENT OFFICE.

WILLIAM HILL, OF BUFFALO, NEW YORK, ASSIGNOR TO CASSIE HILL AND PALEN & BURNS, OF SAME PLACE.

BICYCLE PACKAGE-CARRIER.

SPECIFICATION forming part of Letters Patent No. 600,364, dated March 8, 1898.

Application filed March 12, 1897. Serial No. 627,242. (No model.)

*To all whom it may concern:*

Be it known that I, WILLIAM HILL, a citizen of the United States, residing at Buffalo, in the county of Erie and State of New York, have invented certain new and useful Improvements in Bicycle Package-Carriers; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in bicycle package-carriers, and more particularly to the improved means employed for removably securing the package-carrier to the bicycle-frame.

My invention consists of certain details of construction, all of which will be fully hereinafter described and claimed.

Figure 1:
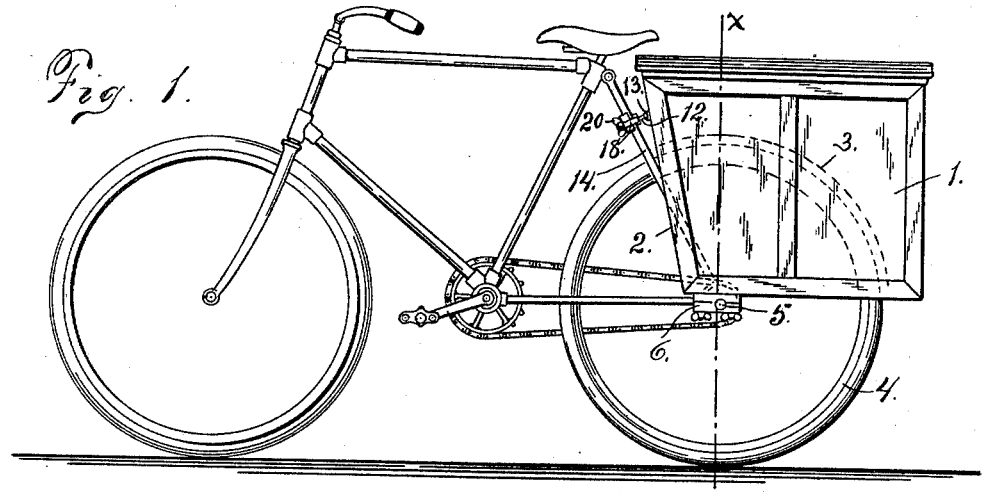
Figure 5:
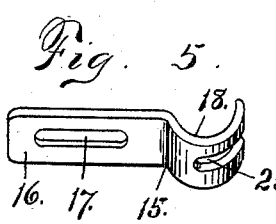
Figure 2:
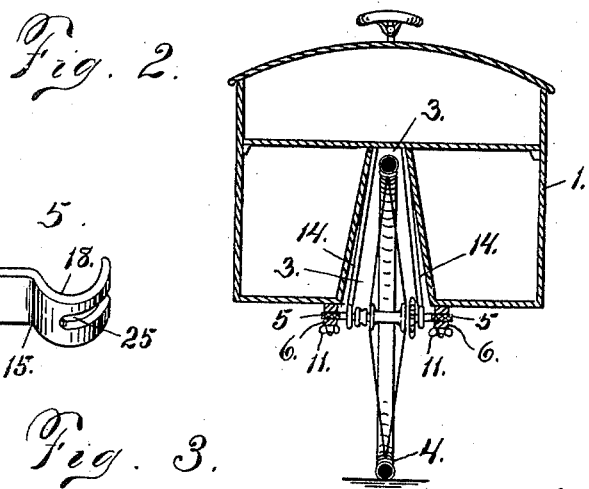
Figure 4:
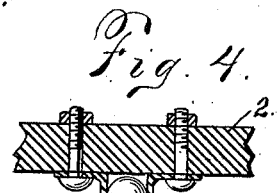
Figure 3:
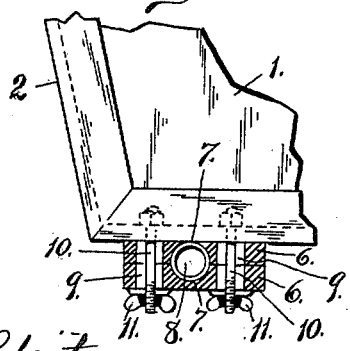
Figure 6:
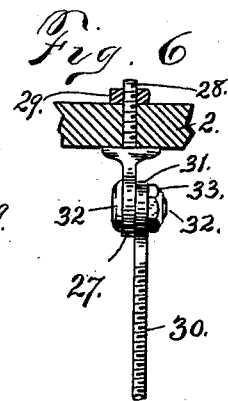

In the drawings, Figure 1 is a side elevation of a bicycle, showing my improved package-carrier attached thereto. Fig. 2 is a vertical section taken in the line $xx$ of Fig. 1. Fig. 3 is an enlarged sectional detail of the lower attaching device for removably securing the package-carrier to the steps on the rear axle. Fig. 4 is a detached detail view, partly in section, of my improved device for removably and adjustably securing the front wall of the package-holder directly to the rear forks of the bicycle-frame. Fig. 5 is a detached perspective view of one of the parts of the device shown in Fig. 4, and Fig. 6 is a modification.

Referring to the drawings, 1 is the package-carrier, which I preferably construct of wood. Its outside configuration is practically rectangular, with its front wall 2 preferably inclined toward the rear. Its dimensions are substantially the same as the package-carriers mounted upon three wheels now in general use. Underneath and opening in front is a segmental recess 3, provided for the reception of the rear wheel 4 of the bicycle, over which wheel it is removably secured.

5 5 are steps or lugs secured upon each end of the axle of the rear wheel 4. Upon the forward edge of the bottom of the carrier 1 and adjacent to each side of the segmental recess 3 are securing devices for attaching the carrier to the steps 5, of which 6 6 are sections. (See Fig. 3.) Each section is provided with a semicylindrical recess 7, which together form a socket 8 for the reception of the step 5. Elongated slots 9 9 in the sections 6 6 are adapted for the reception of the bolts 10 10, which, with the thumb-nuts 11 11, serve to removably secure the step 5 to the carrier. The slots 9 9 are somewhat wider than the bolts 10 10, which permits of sufficient adjustment to keep the rear wheel 4 free from contact with the walls of the segmental recess 3 in the carrier. Other forms of attaching devices might be employed in lieu of those just described, the object sought being quick attachment or detachment of the carrier to the steps 5.

The attaching device for removably securing the front wall 2 of the carrier to the bicycle-frame is clearly shown in detail in Figs. 4 and 5, in which 12 is a screw-threaded rod secured centrally in the upper end of the front wall 2 of the carrier by the ball-and-socket joint 13, which permits of its universal adjustment with respect to the front wall 2. Adjustable on this rod 12 to and from the wall 2 are twin clasps for removable attachment to the rear forks 14 14 of the bicycle-frame, and they are constructed and arranged as follows:

15 15 are twin sections composed of the flat shanks 16 16, having the elongated slots 17 17 and the bifurcated curved ends 18 18. The screw-threaded rod 12 passes through these slots 17 when the shanks 16 are placed in adjustable contact with each other. The nut 19, in engagement with the rod 12, serves to fix the distance of the twin clasps from the wall 2, and the outside thumb-nut 20 serves to lock them tightly in such position, the washers 21 and 22 being interposed between the nuts 19 and 20 and the shanks 16 16. With the above construction the twin clasps can be adjusted at will to or from the front wall 2 of the carrier, as required by the varying inclination of the rear forks in differently-constructed frames.

23 23 are hooks having the screw-threaded shanks 24. These hooks 23 are employed to removably secure the forks 14 14 to the sections 15, as follows: The shanks 24 and adjacent portions are placed within the slots 25 of the bifurcated curved ends 18 of the sections 15 after the outer ends of the hooks 23 have been engaged with the forks 14, as clearly shown in Fig. 4. The nuts 26 are then screwed down tightly upon the shanks 24 of the hooks 23, thus forcing the forks 14 down upon the inner surfaces of the curved ends 18 of the sections 16, where they are securely but removably held. When desired, the forks may be quickly released from engagement with the twin clasps by simply removing the nuts 26, which releases the hooks 23 from around the forks.

In Fig. 6 I have shown a modification of the rod 12 and its ball-and-socket joint 13, which may be used in lieu thereof, if desired. In such figure 27 is an eye with screw-threaded shank 28, which is pressed through the front wall 2 and secured by the nut 29. A screw-threaded rod 30 has an eye 31. Through the eyes 27 and 31 a bolt 32 and nut 33 are secured, which permits of the vertical adjustment of the rod 30, to which the twin clasps may be adjustably secured, as to the rod 12 in Fig. 4.

It is apparent from the foregoing description that my improved carrier is adapted for ready engagement to any of the forms of bicycles now in general use, the twin clasps being adapted by their adjustability to register with and be secured to rear forks of any inclination with respect to the bicycle-frame or of any angle with respect to each other. I have provided a package-carrier with improved attachments, adapting it for ready and simple securement directly to the rear forks and axle of the frame of any bicycle and without the intervention of any auxiliary frame.

I claim—

The combination with the rear forks of the bicycle-frame and the package-carrier removably secured on its under side to steps upon the rear axle, of a screw-threaded rod adjustably secured in the front wall of the package-carrier and twin clasps adjustable upon the screw-rod to and from the package-carrier and adjustable to and from each other to adapt them for removable engagement with rear forks at diffrent distances apart.

In testimony whereof I have signed my name to this specification in the presence of two subscribing witnesses.

WILLIAM HILL.

Witnesses:
 WM. J. MAGAVERN,
 W. T. MILLER.